Sept. 6, 1960 P. M. PAN 2,951,996

VARIABLE TRANSMISSION NETWORK

Filed Aug. 29, 1957

INVENTOR:
PAUL M. PAN,
BY Richard V. Lang
HIS ATTORNEY.

2,951,996

VARIABLE TRANSMISSION NETWORK

Paul M. Pan, Hyattsville, Md., assignor to General Electric Company, a corporation of New York Filed Aug. 29, 1957, Ser. No. 681,085

2 Claims. (Cl. 333—9)

The present invention relates to variable transmission networks and has as an object to provide a new and improved arrangement for controllably adjusting the amount of power supplied from a source and distributed between a pair of load devices.

In one application of the invention, the load devices may take the form of two useful loads in connection with which applicant's invention would perform a variable energy distribution function. In another application of the invention, one load may take the form of a useful load while the other load is a dissipative "dummy" load. In connection with this latter arrangement, the inventive device performs a variable attenuation function.

It is, accordingly, another object of the present invention to provide a new and improved variable attenuator.

It is still another object of the invention to provide a new and improved variable energy distribution arrangement.

While the invention is believed to be of wide application, it is particularly suited for operation at moderately high frequencies wherein waveguides, coaxial lines and strip transmission line techniques may be employed for the transmission of electrical energy. In this application, it may be stated that one illustrative embodiment is particularly suited for operation in the region of 2000 megacycles. In general, such elements become inconveniently large if frequencies of operation below 50 megacycles are contemplated. The upper frequency limits of practical application of the invention are extremely high and it would appear that the invention would function admirably at frequencies much higher than the operating frequency indicated if suitable wave transmission elements are employed.

It is, accordingly, a further object of the present invention to provide a new and improved variable transmission element suitable for operation at relatively high operating frequencies, preferably above 50 megacycles.

It is an additional object of the present invention to provide a new and improved variable attenuator wherein the attenuation is achieved without change in phase in the attenuated wave.

It is still another object of the present invention to provide a new and improved variable energy distribution arrangement wherein readjustment of the energy distributed between two load devices occurs without disturbance of the phase relationships between the waves fed to the respective load devices and the initial signal wave.

These and other objects are achieved in accordance with the present invention by a combination comprising a balanced power divider, a phase adjusting element and a hybrid structure having a first and second pair of mutually isolated or conjugate terminals. If the balanced power divider has one of its output connections coupled to one terminal of one pair of mutually isolated terminals and the other of its output connections coupled through said phase adjusting means to the other terminal of said one pair of hybrid terminals, then upon adjustment of the phase adjusting element, the energy available at the individual terminals of the second mutually isolated pair of hybrid terminals will be varied. The adjustment may be made through a range in which substantially all of the energy is available at one terminal and none is available at the other to a converse condition.

In accordance with a second embodiment of the invention two such phase adjusting elements are inserted between the balanced power divider and the respective terminals of one pair of mutually isolated terminals. These phase adjusting elements are then reversely ganged so that an increase in delay in one path will be accompanied by an equal reduction in delay in the other path. When this is done, the phase of the waves fed to the output devices are substantially unaffected by the attenuation or power division ratio.

The features of the invention which are believed to be novel are set forth with particularity in the appended claims. The invention itself however both as to its organization and method of operation together with further objects and advantages thereof may best be understood by reference to the following description when taken in connection with the drawings, wherein:

Figure 1:
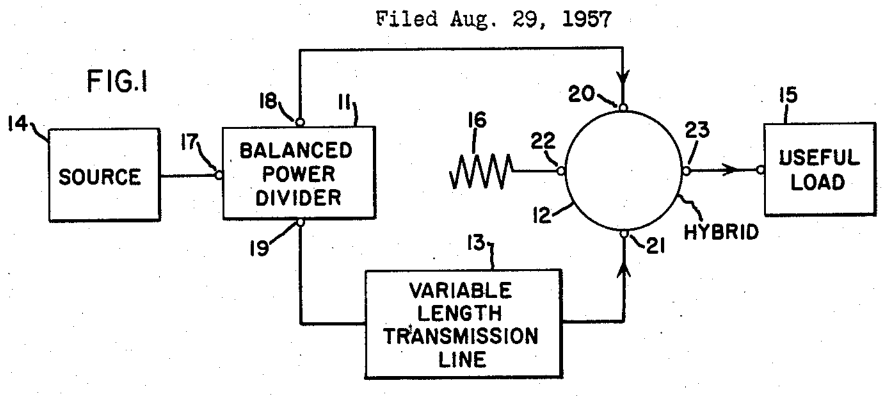
Figure 1 illustrates in electrical block schematic diagram form a first embodiment of the invention for performing variable attenuation of an input wave.

A precision variable attenuator in accordance with the invention is illustrated in Figure 1. It comprises a balanced power divider 11, a four terminal hybrid structure 12 and a variable length transmission line 13, these elements being arranged to provide connection of a source 14 of high frequency waves to a useful load device 15 and to a dummy load device 16.

Since the precision variable attenuator of the invention is of greatest application with respect to microwave frequencies, that is to say at frequencies preferably in excess of 50 megacycles and usually in thousands of megacycles, the elements indicated above should be selected for wave transmissions at the desired microwave frequencies. In general, the elements may conveniently take the form of waveguide, coaxial or "strip" units. With respect to the power divider 11, it may take the form of a simple branch in a piece of coaxial or waveguide transmission line. The variable length transmission line 13 likewise may take a number of common forms involving again either waveguide, coaxial or strip transmission paths and should be of constant impedance. The hybrid 12 illustrated in Figure 1 is a four terminal device which may take the form of a waveguide, coaxial or strip type hybrid ring wherein the path between three adjacent pairs of terminals are one quarter wavelength and the path between a fourth adjacent pair of terminals is three quarters wavelength. The hybrid may also take the form of non-ring type hybrids and may be either broad band or narrow band design.

The connections of the above elements are made in types of transmission lines compatible with the frequencies of operation involved. At the indicated range of frequencies they may take the form of waveguide, coaxial or strip transmission lines. The "strip" type transmission lines are now quite popular, taking the form of an insulated conductor spaced from a ground plane. The above recited elements are interconnected in the following manner employing suitable transmission line techniques. The signal source 14 is coupled to the input terminal 17 of the power divider 11. The output terminals 18 and 19 of the power divider 11 are connected respectively to one terminal 20 of the hybrid ring and to the input of the variable length transmission line element 13. The output of the element 13 is coupled to a second terminal 21 of the hybrid ring arranged (as illustrated in Figure 1) opposite to the terminal 20 and electrically isolated therefrom. The remaining pair of oppositely arranged and mutually isolated terminals 22 and 23 of the hybrid ring 12 are coupled respectively to a dummy load 16 and to the load device 15.

The above variable attenuator has been found to supply a controllable amount of energy from the source 14 to a useful load device, in an amount depending upon the setting of the attenuator. An explanation of how this occurs follows. Signals of appropriate frequency are fed from the source 14 to the balanced power divider 11 at the input terminal 17. The balanced power divider has the property of delivering at its respective output terminals 18 and 19 equal amounts of signals. The signal from terminal 18 is then delivered to terminal 20 of the hybrid ring 12. Simultaneously, a similar portion of signal is fed from the output terminal 19 of the power divider through the variable length transmission line 13 to the terminal 21 of the hybrid ring. Let us assume that the variable length transmission line is adjusted to make the electrical path length between terminals 19 and 21 equal to that encompassed between the terminals 18 and 20. If this is true, waves of like phase and like magnitude will be supplied at the terminals 20 and 21 of the hybrid ring. Under these conditions, assuming quarter wave paths between all pairs of adjacent terminals but 21 and 22, waves from terminals 20 and 21 having experienced equal delays of a quarter wavelength in traveling to terminal 23 will arrive at that terminal in phase, and will be supplied in their entirety to the useful load 15. Since there is a difference in path length between terminals 20 and 22 and the terminals 21 and 22 of one half wavelength, waves reaching the terminal 22 from terminals 20 and 21 will be out of phase, and no power will be supplied to the dummy load 16 coupled to terminal 22.

Figures 2, 3, 4:
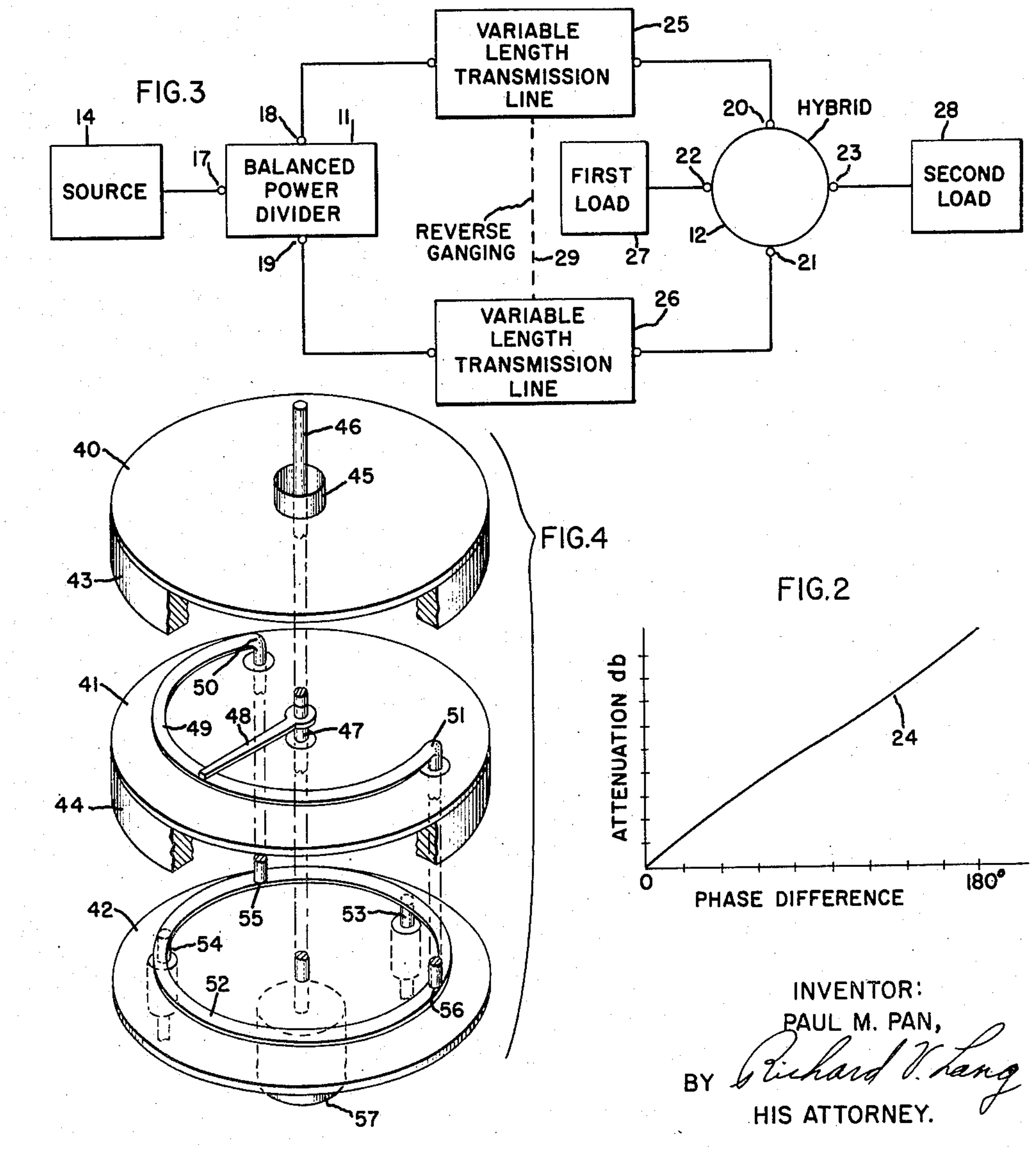
Figure 2 is a graph illustrating the attenuation of the signal with different settings of the attenuator of Figure 1.
Figure 3 is an illustration in electrical block schematic diagram form of a third embodiment of the invention wherein power from a source may be variably distributed between two load devices, this embodiment being further arranged to maintain the phase of the wave supplied to the load devices constant.
Figure 4 is a drawing illustrating the construction of the second embodiment.

Controllable attenuation is achieved by adjustment of the length of the variable length transmission line. When the electrical path length of element 13 is adjusted, the waves appearing at the input terminal 21 of the hybrid ring will no longer be in precise co-phasal relationship with respect to the wave delivered at terminal 20. This condition will prevent precise reinforcement of the waves at the terminal 23 or complete cancellation of the waves at the terminal 22. Accordingly, there will be a reduction of the amount of signal fed to the useful load 15, and an increase in signal fed to the dummy load 16. As the delay introduced by the element 13 is increased, the waves appearing at the terminal 21 ultimately become 180° out of phase with those fed to terminal 20. When this occurs, the energy supplied to the useful load 15 is reduced to a minimum while that supplied to the dummy load 16 is a maximum. The graph illustrating an actual experimental curve 24 of attenuation versus phase delay is shown in Figure 2. It may be observed that the attenuation is a function which increases very nearly linearly with the adjustment of the element 13. It is necessary to have a minimum adjusting range in the element 13 of at least 180 electrical degrees to permit adjustment from a condition of zero to maximum attenuation.

In the above attenuator, the waves to the useful load 15 are not maintained in co-phasal relationship with respect to the waves initially supplied by the source 14. A co-phasal relationship is preserved in the arrangement shown in Figure 3. In Figure 3 reference numerals to elements illustrated in Figure 1 have been repeated where they designate similar elements. As before, a source 14 is shown coupled to a balanced power divider 11. The output terminals 18 and 19 of the balanced power divider are coupled respectively to the input of a first variable length transmission line 25 and to the input of a second variable length transmission line 26 as before the elements 25 and 26 should be constant impedance devices as such devices usually are. The output of the element 25 is then connected to the terminal 20 of the hybrid ring 12 and the output of the element 26 is coupled to the terminal 21 of the hybrid ring 12. At the hybrid ring terminal 22 a first load 27 is coupled and at the terminal 23 a second load 28 is coupled. The variable length transmission line elements 25 and 26 are reversely ganged as illustrated in the drawing by the dotted line 29. The method by which they are ganged is one in which an increase in line length of element 25 is accompanied by an equal but opposite change in line length in the other element 26.

The above arrangement functions in the following manner. Energy supplied from the source 14 is divided equally in a balanced power divider 11 between the elements 25 and 26. Assuming that both elements 25 and 26 are adjusted to provide equal phase delays to the waves arriving at the terminals 20 and 21, all of the waves will appear at terminal 23 in phase and at terminal 22 out of phase. Accordingly, all of the energy will be delivered to the second load 28, which is coupled to the hybrid terminal 23 and substantially none of the energy will be delivered to the load 27 coupled to terminal 22. If now, one introduces a small readjustment of the length of the elements 25 and 26; causing element 26 to introduce a slightly increased delay in the wave fed to the terminal 21 and the element 25 to provide less delay in the wave fed to the terminal 20, then at the output terminal 23, the wave reinforcement will be less than perfect at terminal 23, and the cancellation at the terminal 22 will also be less than perfect, thereby reducing the amount of energy fed to the load 28 and increasing that fed to the load 27. If one continues to increase the delay introduced by the element 26 and to decrease the delay introduced by the element 25, the amount of wave energy supplied to the load 28 will continue to decrease while that supplied to the load 27 will continue to increase. When the delay introduced by the element 25 is 90° and the delay withdrawn by the element 26 is 90°, then the waves supplied at the terminals 20 and 21 will be 180° out of phase bringing about substantially complete cancellation of the waves at the terminal 23 and minimum energy to the load 28 and complete reinforcement of the waves at the terminal 22 and maximum energy to the load 27. It is, accordingly, desirable that the elements 25 and 26 each be arranged to provide a full 90 electrical degrees of adjustment.

The arrangement illustrated in Figure 3 supplies waves to the loads 27 and 28 in fixed phase relationship with respect to the waves supplied by the source 14 independent of the setting of the elements 25 and 26. The waves from terminals 20 and 21 reaching the terminal 23 experience equal delays in the hybrid, and the resultant wave at the terminal 23, assuming equal magnitude waves, will take a phase position mid-way between the waves as they appear at the terminal 23. Accordingly, if one input wave is advanced a given number of electrical degrees, and the other is retarded a like number of electrical degrees, in the manner provided by the arrangement in Figure 3, the resultant will neither be advanced nor retarded but will assume an intermediate position of zero electrical degrees. The same condition is true with respect to the waves supplied to the load 27. Here, the path 21—22 through the hybrid brings about a differential delay of 180° in the wave fed to the terminal 21 over that fed to the terminal 20. If we now increase the delay in one element and decrease it equally in the other, the resultant, taking an intermediate position between one wave and the inversion of the other, will at all times be stationary in phase.

Figure 4 illustrates in an exploded view, one physical arrangement for carrying out the invention illustrated in block diagram form in Figure 3. It may be seen to be comprised of three conductive discs 40, 41 and 42 arranged upon a common axis and supported in spaced mutually parallel alignment upon the conductive ring members 43 and 44, respectively. The input terminal of the variable power divider is a coxial line concentrically arranged with the center of the ring 40 having its outer conductor 45 grounded to the upper surface of the disc 40. The central conductor 46 of the coaxial line passes downwardly through the center of the disc 40 and is held in insulated relationship with respect thereto.

The intermediate disc 41 supports the elements providing balanced power division and differential line length adjustment, which elements are the counter parts of a balanced power divider 11 and the adjustable length transmission lines 25 and 26 shown in Figure 3. These elements comprise a rotating conductor 47, a pivotal support 48 for the conductor, and a stationary conductor member 49, upon which the rotating conductor 47 is arranged to make slidable contact. The rotating conductor 47 is pivotally supported above the upper surface of the disc 41, the pivotal support 48 being concentric with the disc and providing an insulating support to the contact arm. The inner conductor 46 of the coaxial line is electrically connected to the pivoted extremity of the arm 47. The strip conductor 49 is also supported upon the upper surface of the disc 41. It takes the form of a circular ring concentrically arranged about the pivot 48 and spanning approximately 240° of arc. The strip conductor 49 is supported mid-way between the discs 40 and 41 upon insulating supports. The strip conductor is thus so arranged, that the outer extremity of the arm 47 makes sliding contact with the surface of the strip conductor. At the ends of the conductor 49 a pair of insulated end terminals 50 and 51 are provided having conductive elements passing down through the disc 41 toward the disc 42.

The elements 47 and 49 in combination with the adjacent surfaces of the discs 40 and 41 form a strip transmission line system. The arm 47 makes contact with the strip transmission line 49 at an intermediate point and thus initiates transmission of wave energy in both directions down the transmission line 49 to the output terminals 50 and 51. The positioning of the arm 47 differentially controls the respective lengths of the paths for waves ultimately delivered to the respective end terminals 50 and 51, since an increase in path length between the contact arm 47 and the terminal 50 is accompanied by an equal decrease in path length from the arm 47 to the terminal 51. The total length of the path along element 49, which is 240° of arc, corresponds to 360 electrical degrees at the contemplated operating frequencies. This dimensioning permits the arm 47 to swing 90° in either direction from a central position without approaching the terminals 50 and 51 so closely as to appreciably disturb the equality of power distribution.

The disc 42 supports the hybrid elements and the output coaxial lines which may be coupled to appropriate output or load devices. The hybrid is also formed by strip transmission line techniques taking the form of a complete circular ring 52 supported in insulated relationship mid-way between the conductive plates 41 and 42. It may be of the same diameter as the ring 49 employed with the adjustable langth elements. It is provided with four terminals 53, 54, 55 and 56, the terminals 53 and 54 respectively being placed opposite to the point of entry of the end terminals 50 and 51 from the adjustable length transmission line elements. The terminals 55 and 56 of the ring 52 are spaced between the terminals 53 and 54 and on opposed segments of the ring. The terminal 53, including an output coaxial line passing downward through the disc 42, is coupled at the middle of the shorter or 120° portion of the arc included between the terminals 53 and 54 and thus is spaced 60° of arc from each of the terminals 53 and 54. The terminal 56 which also includes a downwardly extending coaxial line is supported upon the longer or 240° portion of arc included between the terminals 53 and 54. It is located 60° of arc from the terminal 53 and 180° of arc from the terminal 54.

Adjustment of the above device is achieved by the knob 57 pivotally supported upon the under surface of the disc 42 and mechanically coupled to the arm 47 at the pivot 48. Rotation of the knob 57 thus causes rotation of the arm 47.

The above elements 52, 53, 54, 55 and 56 form a hybrid ring in strip transmission line form. The ring is dimensioned to provide $\frac{3}{2}\lambda$ wavelengths at contemplated operating frequencies about its perimeter and to have $\frac{1}{4}\lambda$ separation between all adjacent pairs of terminals but terminal pair 54 and 56, in which the separation is $\frac{3}{4}\lambda$. From this spacing, it may be seen that terminals of terminal pair 53 and 54, and terminals of terminal pair 55 and 56 are mutually isolated or conjugately related. This arises from the fact that waves entering at one terminal of either pair, and progressing around the ring in opposite directions, arrive in opposite phase and thus cancel one another at the other terminal of that pair, as a brief inspection of the structure shows.

The arrangement illustrated in Figure 4 thus corresponds to the block diagram shown in Figure 3 except for the omission of the load devices. As shown in Figure 3, the arrangement illustrated in Figure 4 may be used to provide adjustable energy distribution between either of two load devices coupled to the output terminals 55 and 56. One may also couple the dummy load device to one of the output terminals 55 and 56, and thus employ the illustrated arrangement as a variable attenuator.

In using strip transmission line techniques in the arrangement in Figure 4, an extremely simple and excellently shielded arrangement has been achieved. As indicated earlier, however, the invention may also be carried out with other transmission elements than those illustrated in Figure 4. For instance, the strip transmission lines may be replaced by coaxial line elements and waveguide transmission line elements. It may also be observed that while a ring type of hybrid structure is employed, one may also use devices of the magic "T" type. One may also employ other types of phase adjusting means than the adjustable length transmission line elements illustrated. All such devices, however, should be characterized by constant impedances.

The invention when applied to wave attenuation has several advantages over known attenuators, particularly of the waveguide type. It may be observed that the insertion loss of applicant's invention is negligible and that all power dissipation may occur in an externally coupled load. This permits the invention to be applied in very high power applications.

Accordingly, while particular embodiments of the invention have been shown and described, it should be understood that the invention is not limited thereto, and it is intended in the appended claims to claim all such variations as fall in the true spirit of the present invention.

What I claim as new and desire to secure by Letters Patent of the United States is:

1. In combination, a balanced power divider having a first and second output connection, a first and a second identical constant impedance phase adjusting element, a hybrid structure having a first and a second pair of mutually isolated terminals, means coupling said first phase adjusting element between said first output connection and a first one of said first pair of mutually isolated terminals, means coupling said second phase adjusting element between the second of said output connections and the second terminal of said first pair of mutually isolated terminals, reverse ganging means coupling said phase adjusting elements for simultaneously adjusting the phase of said phase adjusting elements in substantially matching equal increments between each of said elements but in opposite senses, and means for coupling a utilization device to at least one of said second pair of mutually isolated terminals.

2. The combination set forth in claim 1 wherein said phase adjusting elements are adjustable length transmission line elements.

References Cited in the file of this patent

UNITED STATES PATENTS

| | | |
|---|---|---|
| 2,437,067 | Bingley | Mar. 2, 1948 |
| 2,593,120 | Dicke | Apr. 15, 1952 |
| 2,685,065 | Zaleski | July 27, 1954 |
| 2,702,371 | Sunstein | Feb. 15, 1955 |
| 2,718,580 | Shirley | Sept. 20, 1955 |
| 2,728,050 | Van De Lindt | Dec. 20, 1955 |

OTHER REFERENCES

Tyminkski and Hylas: "A Side Band Hybrid Ring," Proceedings of the IRE, January 1953, pages 81–86.